G. H. WHITELEY, Jr.
MOLD FOR MOLDING ARTIFICIAL TEETH.
APPLICATION FILED SEPT. 11, 1913.
1,328,351.
Patented Jan. 20, 1920.
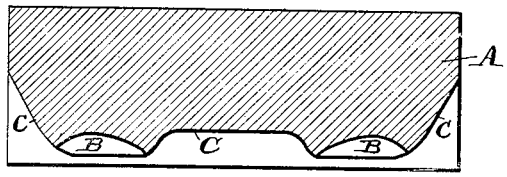
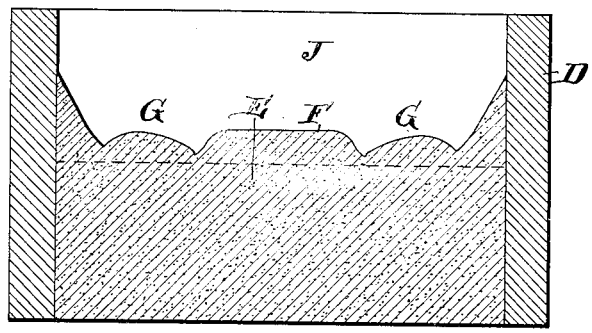
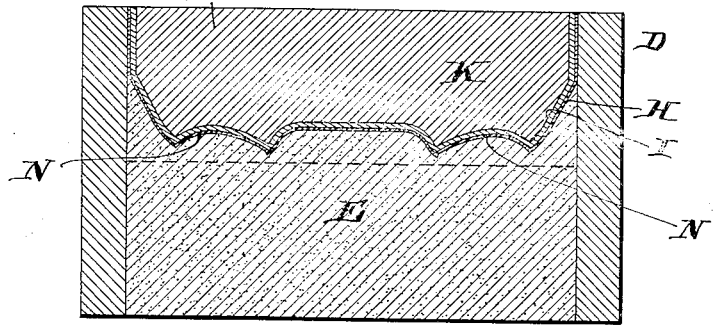
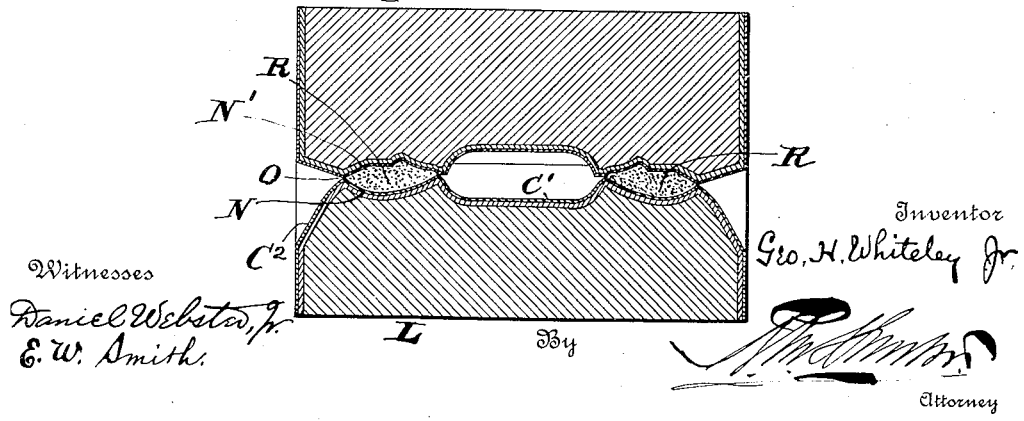
Witnesses
Daniel Webster, Jr.
E. W. Smith.
Inventor
Geo. H. Whiteley Jr.
By
Attorney

UNITED STATES PATENT OFFICE.

GEORGE H. WHITELEY, JR., OF YORK, PENNSYLVANIA, ASSIGNOR TO THE DENTISTS' SUPPLY COMPANY, A CORPORATION OF NEW YORK.

MOLD FOR MOLDING ARTIFICIAL TEETH.

1,328,351.      Specification of Letters Patent.      Patented Jan. 20, 1920.

Application filed September 11, 1913. Serial No. 789,243.

*To all whom it may concern:*

Be it known that I, GEORGE H. WHITELEY, Jr., a citizen of the United States, and resident of York, county of York, and State of Pennsylvania, have invented an Improvement in Molds for Molding Artificial Teeth, of which the following is a specification.

The object of my invention is to provide a construction of molds for molding artificial teeth, which shall be capable of being duplicated at very low cost and be cheaply and easily replaced when worn.

Heretofore, it has been customary in the manufacture of artificial teeth to make the molds in solid brass and hand finished; and each mold arranged to simultaneously mold a full set of upper and lower teeth. As these molds have to be formed from patterns made by hand carving representing the accurate shape of the teeth, and moreover, insure accurate contacting of the two parts of the mold to form the margins of the molded teeth in a clean and accurate manner, it is a very expensive operation.

Furthermore, in manufacturing artificial teeth upon a large scale, it is necessary to have a considerable number of these molds, all of which will be duplicates of any particular character of teeth, and it is very expensive to make up this necessarily large number of operative molds. As a factory will produce a variety of different forms of teeth, it follows that there are a number of sets of molds, every set comprising a plurality of similar molds.

The object of my invention is to provide a simple and inexpensive construction of mold and method of making same, whereby, after the original carving of the teeth forms have been made, the molds themselves may be duplicated in any desired number at a small expense, thereby not only reducing the first initial cost of equipping the factory with such molds, but also enabling replacements of worn out molds to be readily and cheaply accomplished.

In carrying out my invention, I first prepare a carved form or master pattern which represents all of the teeth of a set, and from this I prepare, directly or indirectly, a mold pattern in a plastic or waxlike composition, which may be of suitable character to receive an electro-plating of a metal upon its surface.

In practice, I prefer to make the first deposition of a metal such as nickel or nickel steel on account of its hardness, and upon this, a further deposition of copper; and the matrix so formed is then backed up with a suitable metal having a sufficiently high resistance against being fused as will meet the requirements of the preliminary baking operation necessary to harden the molded bisque teeth before they are removed from the mold preparatory to being fired or vitrified under high temperature.

Each portion of the complete mold is made in the same manner, and the two sections will properly fit and be in condition for use with practically no additional finishing being required, if the master pattern was perfectly smooth. The electro-plating, and especially that part thereof constituting the tooth recesses will be smooth and in a highly finished state.

These surfaces may be polished with suitable polishing material if so desired. By forming the molds in this manner, the same patterns may be employed a large number of times for duplicating the molds, without being in any material way injured; and the cost of reproducing these molds of any pattern of teeth will be only nominal as compared to the present cost, which involves a great deal of handwork on each mold.

In the ordinary procedure of making molds under my improved method, the tooth pattern which is formed for each mold section may be used as the cathode during the plating operation, or what is more desirable, it may be employed to impress or otherwise form in plastic material, whether of a composition of wax or other material in plastic state such as plaster of Paris which sets, an impression which may be then plated directly with copper or with a preliminary electro-plating of nickel or nickel steel or other hard metal or compound which will withstand wear better than copper.

If this harder metal is employed as the outer coating of the finished mold, it may be very thin and be backed by the copper deposition and ultimately by a material such as a hard type metal composition.

By forming the cathode of the proper shape, an outer shell constituting all but the back of the mold may be thus produced and filled with the hard type metal or its equivalent. The two parts of the mold thus formed, having their complementary tooth parts adapted to meet, may be made to properly position with respect to each other by use of the dowel pins and holes or otherwise, as is customary in two-part molds.

My invention will be better understood by reference to the accompanying drawings, in which:

Figure 1 is a transverse section of a pattern prepared by hand; Fig. 2 is a transverse section of a mold containing wax in which the pattern has been impressed for providing an impression from which to make an electro-type; Fig. 3 illustrates a similar cross section of the mold and with an electro-type formed therein and preferably backed to give it solidity; and Fig. 4 is a transverse section through a completed two-part mold employed in connection with the molding of teeth in the commercial manufacture thereof.

A represents a pattern formed of plaster of Paris or any suitable composition, or if desired, of metal. This pattern may be carved by hand, or first molded and then carved, the purpose being to secure a master pattern which will be exactly of the right proportion and shape. Ordinarily, each such pattern would represent one-half of a completed mold and would have the configuration of a full set of teeth, it being the purpose of the completed mold to mold one complete set of upper and lower teeth at one time, although this is not essential to my invention. In using this master pattern as a basis from which to prepare the numerous duplicate molds necessary in the commercial manufacture of teeth upon a large scale, I impress the same into a body of wax E placed in a rectangular casing D preferably of metal, whereby the recesses B corresponding to the configuration of the teeth produce the raised portions G in the wax, and the outer surface portions C of the pattern produce the parts F in the wax. When the wax has been so prepared, it is dusted in the usual manner with plumbago for the purpose of giving it a conducting surface suitable for electro-plating. It is then subjected to the electro-plating operation, and there is deposited upon the surfaces F, G, of the wax and within the case D, a fine electrically deposited layer of metal. I prefer, in practice, to make the first deposit of a hard metal such as nickel or nickel steel, which is indicated at H, Fig. 3, and this I back up with an electrically deposited layer of copper I. Furthermore, the electro-deposition of the nickel or nickel steel or other hard, durable metal or compound, is preferably deposited under a low voltage so as to make an exceedingly fine smooth deposit, which will give to the finished article a very smooth surface. The backing deposit of copper I may be more rapidly deposited by using a higher voltage, for the use of said copper is merely to give additional strength to the delicate nickel or nickel compound shell first deposited. If this electrically deposited shell I, H, is to be used as a matrix or pattern for the duplication of the molds, the interior space within the electroplated shell may be filled with a filling K of plaster of Paris or any suitable cement such as magnesite made into a paste with magnesium chlorid, or may be backed with a fusible metal so as to give rigidity and strength, so that it may be handled without distortion. Where only a few duplicates of the molds are to be made, the master pattern may be employed for preparing each of the impressions in wax, but where there are a considerable number of molds to be made or where a pattern is in material which is liable to deteriorate by continued use, it is then preferable to form a matrix or die which will correspond to the electroplated and filled part L of Fig. 3 which I have above described. This may then be employed as the die for making all of the subsequent impressions in the wax from which the several molds are to be formed by electro-plating. While it is desirable that this matrix or die shall be formed of the double electro-plating I and H, it is evident that inasmuch as it is only required to act upon a wax body, it may be formed of a single electro-plated shell which may be copper or any other suitable metal and properly backed. When the prepared wax in the form indicated in Fig. 2 is electroplated for the permanent mold part, the electro-plating within the space J and upon the surfaces F, G, of the wax impression is carried on as above described in the making of the matrix or die, and this shell when removed is then filled with a metal which has sufficient resistance to heat that the mold may be subjected to the baking temperature when preparing the molded bisque teeth preliminary to the firing of the same. In the ordinary way of backing the electro-plated shell, the backing metal which may be of a suitably hard type metal, is poured into the shell and the upper surfaces are then finished by planing or otherwise grinding them to a finish. In Fig. 4, are indicated two halves of the completed mold, the lower half L corresponding to the shape indicated in Figs. 1, 2 and 3; whereas the upper half M would be formed in a similar manner but from a different master pattern. These mold parts have respectively the tooth cavities N and N' between which the bisque R is molded by being compressed, the juncture O of the said mold parts about the margins of the molded tooth portions giving a clean finish to the molded material, the parts C' and C² of the mold portions being separated so as to form clearance spaces between the molds around the tooth recesses N and N'. When casting the backing metal into the electro-plated shell, the shell may, if desired, be supported in a suitable plaster of Paris support so as not to be distorted while receiving the heavy molten metal. The shape of the support would be substantially what is indicated in Fig. 2, but might be all made of plaster of Paris.

It will now be seen that after the die or pattern matrix has been properly prepared, it may be employed numerous times for giving duplicate impressions in wax surfaces for forming a mold which may be electroplated, and the duplicate molds produced through this process will all be identically alike, and moreover, will be cheaply and accurately constructed and with a perfectly smooth polished tooth surface if the original pattern has been properly prepared.

I have described the general process of making the molds in the preferred form, but I do not restrict myself to the minor details, either as to composition or the shape or configuration of the mold parts, as these would be varied to suit the particular character of teeth which were to be made by use of the finished molds.

Having now described my invention, what I claim as new and desire to secure by Letters Patent, is:—

1. A mold device of general rectangular shape for the manufacture of artificial teeth, which consists of a two-part mold having contacting portions, each mold part having a plurality of recesses bounded by relatively sharp contacting parts which in the assembled mold parts provide a plurality of inclosed hollow spaces conforming to the shape of the artificial teeth to be molded, each of said mold parts having its surface consisting of a continuous irregular layer of electrically deposited metal forming the surface of the mold including the recesses and the contacting parts so that the surface is devoid of joints, and said thin electrolytically formed layer backed with a deep mass of resistant material for holding the continuous thin surface layer against distortion, said backing mass being a great many times the thickness of the electrolytically deposited layer and entirely covered on the molding surface by the electrically deposited layer.

2. A mold for the manufacture of artificial teeth, which consists of a two-part mold having a plurality of recesses bounded by relatively sharp contacting parts which in the assembled mold parts provide a plurality of hollow spaces corresponding to the artificial teeth to be molded, each of said mold parts having its surface consisting of a continuous irregular layer of electrically deposited very hard metal forming the surface of the mold including the recesses and the contacting parts so that the surface is devoid of joints, and said thin layer backed with a second continuous layer of less hard metal electrically deposited upon the first mentioned hard layer and the compound layers further backed with a mass of resistant material for holding the continuous layer against distortion, said backing mass being entirely covered on the molding surface by the electrically deposited layer.

In testimony of which invention, I hereunto set my hand.

GEORGE H. WHITELEY, Jr.

Witnesses:
WILLIAM SMALL,
CHARLES L. RODGERS.